Patented Nov. 26, 1940

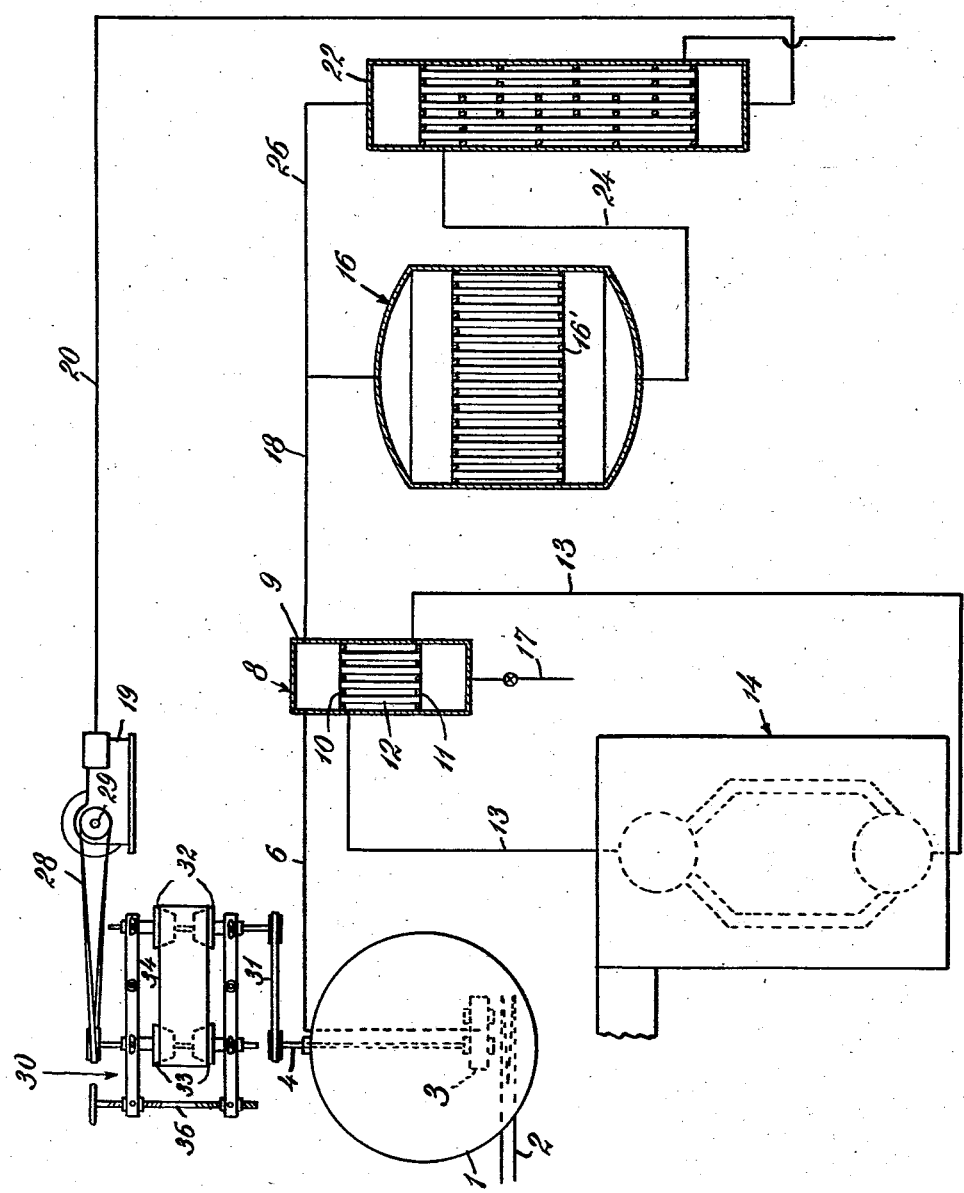

2,222,870

UNITED STATES PATENT OFFICE 2,222,870

PROCESS AND APPARATUS FOR PRODUCING REACTION MIXTURES

Walter H. Kniskern, Petersburg, Va., assignor to The Solvay Process Company, New York, N. Y., a corporation of New York Application September 17, 1938, Serial No. 230,519

7 Claims. (Cl. 260—342)

This invention relates to vapor phase reactions and more particularly to a process and apparatus for producing substantially uniform mixtures of the vapors of organic materials and gaseous reagents for use in vapor phase reactions.

In the vapor phase reaction of organic materials, e. g. the catalytic oxidation of naphthalene to produce phthalic anhydride, it is desirable to introduce into the catalytic converter a uniform mixture of preheated oxidizing gas such as air and naphthalene vapors substantially free from tars which deleteriously affect the activity of the catalyst. Furthermore, it is important to maintain the amount of organic vapors in the mixture outside of the limits within which the mixture may explode.

An object of the invention is to provide a process and apparatus for the production of uniform mixtures of gaseous reagents and vapors of organic materials for carrying out vapor phase reactions.

It is a further object of the invention to provide a process and apparatus for vaporizing measured amounts of liquid hydrocarbons, such as crude naphthalene containing tar, to produce hydrocarbon vapor substantially free from tar and for mixing the vapor with a controlled amount of preheated oxidizing gas to produce a substantially uniform mixture of vapor and oxidizing gas containing insufficient hydrocarbon vapor to create an explosion hazard. Other objects and advantages will appear hereinafter.

In accordance with the invention, I pump measured amounts of liquid hydrocarbon, such as crude naphthalene containing tar, to a vaporizer which vaporizes the hydrocarbon at a rate which varies quickly in accordance with changes in the rate of introduction of the hydrocarbon into the vaporizer. I prefer to employ a vaporizer in which a small body of liquid hydrocarbon is quickly vaporized, for example, by contact with a heated surface, without vaporizing the tar. Hydrocarbon vapors from the vaporizer are mixed with preheated oxidizing gas such as air supplied by a gas pump driven from any suitable source of power, and the tar-free mixture is introduced into a converter where it is reacted to produce the desired reaction products, e. g. phthalic anhydride. The liquid and gas pumps are driven at a desired speed ratio from the same source of power and hence supply uniform proportions of liquid hydrocarbon and oxidizing gas to the vaporizer and converter respectively. The amount of hydrocarbon vapors supplied by the vaporizer varies quickly in accordance with the amount of liquid hydrocarbon supplied thereto, i. e. in accordance with the speed of the gas and liquid pumps, and hence the mixture introduced into the converter contains substantially uniform proportions of vapors and oxidizing gas. Owing to the substantially uniform composition of the mixture of vapors and oxidizing gas supplied to the converter in accordance with the invention, I may utilize a higher proportion of hydrocarbon vapors to oxidizing gas without creating dangerous explosion hazards than has heretofore been feasible, thus increasing the output of the converter. Furthermore, crude hydrocarbons containing tar may be utilized as the source of hydrocarbon vapors without introducing the tar into the converter where it would deleteriously affect the catalyst.

The accompanying drawing is a view, somewhat diagrammatic in character, illustrating one embodiment of the invention. In the drawing reference numeral 1 designates a storage tank for crude naphthalene maintained in liquid condition by heat supplied by steam coil 2. Pump 3, located within the tank, is driven through shaft 4 and pumps liquid naphthalene through conduit 6 to vaporizer 8. Pump 3 is of the type delivering a constant quantity of naphthalene per revolution. For example, it may be of the well known gear type in contradistinction to a centrifugal pump in which there is no fixed relation between revolutions and quantity discharged. Alternatively, pump 3 may be of the piston type equipped with a control lever (not shown) for varying the length of the piston stroke. Such pumps are well known in the pump art and require no further description.

Vaporizer 8 involves a shell 9 equipped with tube sheets 10 and 11 having secured therein a plurality of tubes 12 which are heated by heating medium such as diphenyl oxide vapor, steam, oil, mercury or other heating medium circulated through the space surrounding the tubes, conduits 13 and a heater such as the boiler 14. Liquid naphthalene introduced into the vaporizer is distributed in the heated tubes 10 and flows downwardly over the interior surfaces of the tubes where it is vaporized. If desired any suitable apparatus (not shown) may be employed for distributing the naphthalene uniformly in the various tubes. The vapors rise and pass through conduit 18 to tubular converter 16 equipped with catalyst containing tubes 16', and the tarry residue from the liquid naphthalene is removed from the vaporizer through valved conduit 17. Since the amount of liquid naphthalene present in the vaporizer at any time is small and is quickly vaporized, change in the speed of the pump 3 with resultant variation in the rate of introduction of naphthalene into the vaporizer quickly causes a proportional change in the rate of flow of naphthalene vapors through conduit 18 to the converter. While I have illustrated a vaporizer involving a plurality of heated tubes over the walls of which naphthalene flows, it will be evident that any suitable vaporizer, the vapor output of which varies quickly with change in the amount of naphthalene introduced, may be employed. Preferably, I utilize a vaporizer in which a film or small body of naphthalene is continuously vaporized by contact with one or more heated surfaces.

Reference numeral 19 designates an air compressor for forcing air through conduit 20 and heat interchanger 22 where it is preheated, e. g. to a temperature of about 250° C. by indirect heat exchange with hot phthalic anhydride containing gases introduced into the interchanger through conduit 24. The air compressor is of the type delivering a constant quantity of air for each cycle of operation, e. g. revolution, as distinguished from blowers in which there is no fixed relation between the number of revolutions and quantity of air discharged; for example, the compressor may be a pump of the well known reciprocating piston type. The preheated air, which may be under a pressure of 10–12 pounds per square inch gauge passes through conduit 26 to conduit 18 where it is mixed with naphthalene vapors from the vaporizer; the mixture is then introduced into the converter.

The air compressor 19 may be driven from any suitable source of power (not shown) and drives the pump 3 through gearing including belt 28 connecting the shaft 29 of the compressor with variable speed transmission device 30, belt 31 and shaft 4. The variable speed transmission device may be of the well known Reeves type involving cone pulleys 32, 33, belt 34 and manually adjustable screw 36 for varying the speed ratio between compressor 19 and pump 3. If the naphthalene storage tank is located some distance from the compressor, it may be desirable to utilize a synchronous electric motor for driving the naphthalene pump, which motor may be supplied with current from an electric generator driven by the compressor through a variable speed device. When the pump is a variable stroke pump or of a type permitting manual adjustment of the quantity discharged per revolution, the variable speed transmission device may be omitted. Since both the liquid pump 3 and the air compressor 4 deliver constant amounts of liquid and air respectively during each cycle of operation, e. g. revolution, they deliver constant proportions of liquid and air for each adjustment of the variable speed device or pump, notwithstanding variations in the speed of the compressor.

In operation of the apparatus to produce phthalic anhydride by the catalytic oxidation of naphthalene, air compressor 19 circulates air through heat exchanger 22 where it is preheated by indirect heat exchange with hot phthalic anhydride containing gases and the preheated air is mixed with napthalene vapors in conduit 18 from which the mixture passes into the converter. The air compressor drives the liquid naphthalene pump through the variable speed device 30 to introduce crude liquid naphthalene into the vaporizer 8 where the naphthalene is vaporized as it flows downwardly over the interior surfaces of the tubes 12. Tarry constituents of the naphthalene are not vaporized and the tar-free naphthalene vapors rise and pass through conduit 18 where they are mixed with the preheated air and the mixture is introduced into the converter. The variable speed device is adjusted so that the liquid naphthalene is introduced into the vaporizer at a rate such that the vapors from the vaporizer and the air form a naphthalene vapor-air mixture containing the desired proportion of naphthalene, e. g. .75 mol per cent of naphthalene vapors. The speed ratio between the air compressor and the pump remains constant for any setting of the variable speed device 30 and hence the compressor and pump deliver constant proportions of air and liquid naphthalene to conduit 18 and the vaporizer respectively, notwithstanding variations in the speed of the compressor. Any change in the rate of introduction of liquid naphthalene into the vaporizer is quickly followed by a corresponding change in the rate of flow of naphthalene vapor through the conduit 18 so that the proportions of air and naphthalene introduced into the converter are maintained substantially constant. Owing to the substantially uniform composition of the mixture of air and naphthalene vapor introduced into the converter in accordance with the present invention, I may, without creating explosion hazards, utilize a mixture containing a higher proportion of naphthalene than has heretofore been feasible, thereby increasing the phthalic anhydride output of the converter. Furthermore a tar-free, substantially uniform mixture of preheated air and naphthalene vapor derived from crude naphthalene containing tar is obtained.

While I have described the production of substantially uniform mixtures of naphthalene vapor and an oxidizing gas, it will be evident the invention is applicable to the production of mixtures of the vapors of other organic materials and reagent gases. Since certain changes may be made in the above process and apparatus without departing from the spirit of the invention, it is intended that the above description should be interpreted in an illustrative and not in a limited sense.

I claim:

1. Apparatus for the vapor phase catalytic oxidation of hydrocarbons comprising in combination a vaporizer involving a heated surface for vaporizing a small body of liquid hydrocarbon in contact therewith, a pump for supplying liquid hydrocarbon to said vaporizer, said pump delivering a substantially constant amount of liquid during each cycle of operation thereof, a catalytic converter, means for conducting hydrocarbon vapors from said vaporizer to said converter, a compressor for compressing oxidizing gas, said compressor delivering a substantially constant amount of oxidizing gas during each cycle of operation thereof, means for preheating oxidizing gas from said compressor and mixing the preheated gas with said hydrocarbon vapors, means for driving said compressor, and means for driving said pump from said compressor at a speed bearing a constant ratio to the speed of said compressor whereby the proportions of vapors and oxidizing gas introduced into said converter are maintained substantially constant.

2. Apparatus for the vapor phase catalytic oxidation of hydrocarbons comprising in combination a vaporizer involving a heated surface for vaporizing a small body of liquid hydrocarbon in contact therewith, a pump for supplying liquid hydrocarbon to said vaporizer, said pump delivering a substantially constant amount of liquid hydrocarbon during each cycle of operation thereof, a catalytic converter, means for conducting hydrocarbon vapors from said vaporizer to said converter, a compressor for compressing oxidizing gas, said compressor delivering a substantially constant amount of oxidizing gas during each cycle of operation thereof, means for preheating oxidizing gas from said compressor and mixing the preheated gas with said hydrocarbon vapors, means for driving said compressor, means for driving said pump from said compressor at a speed bearing a constant ratio to the speed of said compressor whereby the proportions of vapors and oxidizing gas introduced into said converter may be maintained substantially constant, and means for varying the output of said pump with respect to the speed of said compressor whereby the proportions of vapor oxidizing gas introduced into said converter may be varied.

3. In a process of catalytically oxidizing naphthalene, the steps comprising continuously vaporizing a small body of crude liquid naphthalene containing tarry constituents in contact with a heated surface without vaporizing the tar, supplying crude liquid naphthalene to said surface, compressing an oxidizing gas, preheating said compressed oxidizing gas, mixing the preheated gas with naphthalene vapors from said surface, passing the mixture into a catalytic converter, and varying the rate of introduction of said crude liquid naphthalene onto said heated surface in accordance with the changes in the rate of compressing said oxidizing gas whereby the proportions of oxidizing gas and naphthalene vapor in the mixture introduced into said converter are maintained substantially uniform.

4. Apparatus for the vapor phase catalytic reaction of normally liquid organic materials comprising in combination a vapor phase catalytic converter, a liquid pump delivering a substantially constant amount of said liquid organic material during each cycle of operation of said pump, means for vaporizing said liquid substantially at the rate it is supplied by said pump, a gas compressor delivering a substantially constant amount of reaction gas during each cycle of operation of said compressor, means for driving said liquid pump and said gas compressor at a constant speed ratio whereby the proportions of gas and liquid supplied by said compressor and pump may be maintained substantially constant and means for conducting the vapors of said liquid organic material and the reaction gas to said catalytic converter.

5. Apparatus for the vapor phase catalytic oxidation of normally liquid organic materials comprising in combination a vapor phase catalytic oxidation converter, a liquid pump delivering a substantially constant amount of said liquid organic material during each cycle of operation of said pump, means for vaporizing said liquid substantially at the rate it is supplied by said pump, a gas compressor delivering a substantially constant amount of oxidizing gas during each cycle of operation of said compressor, means for preheating said oxidizing gas, means for driving said gas compressor and said liquid pump from the same source of power at a constant speed ratio whereby the proportions of gas and liquid supplied by said compressor and pump may be maintained substantially constant, means for adjusting the output of said liquid pump with respect to the output of said gas compressor, and means for conducting the vapors of said liquid organic material and the oxidizing gas from said gas compressor to said catalytic converter.

6. In a process of catalytically oxidizing normally liquid organic material, the steps comprising continuously pumping said organic material into a vaporizing zone at a predetermined rate, vaporizing said liquid material quickly after it enters said zone at substantially the rate at which it is introduced into said zone, passing the resultant vapors into a vapor phase catalytic oxidation converter, compressing an oxidizing gas, introducing said compressed oxidizing gas into said vapor phase catalytic converter and varying the rate of introduction of said liquid organic material into said vaporizing zone in accordance with changes in the rate of compressing and introducing said oxidizing gas whereby the proportions of oxidizing gas and organic material vapor introduced into said converter are maintained substantially uniform.

7. In a process for catalytically oxidizing normally liquid organic hydrocarbon material containing impurities of higher boiling point than the hydrocarbon, the steps comprising continuously vaporizing a small body of the liquid hydrocarbon material in contact with a heated surface without vaporizing said impurities, supplying the liquid hydrocarbon material to said surface, compressing an oxidizing gas, preheating said oxidizing gas, mixing the preheated gas with the hydrocarbon vapors from said surface, passing the mixture into a catalytic converter and varying the rate of introduction of said liquid hydrocarbon material onto said heated surface in accordance with the changes in the rate of compressing said oxidizing gas, whereby the proportions of oxidizing gas and hydrocarbon vapor in the mixture introduced into said converter are maintained substantially uniform.

WALTER H. KNISKERN.